No. 716,803. Patented Dec. 23, 1902.
E. ZAHM & J. A. JUST.
PROCESS OF PURIFYING GAS.
(Application filed Apr. 10, 1900. Renewed July 29, 1902.)
(No Model.)
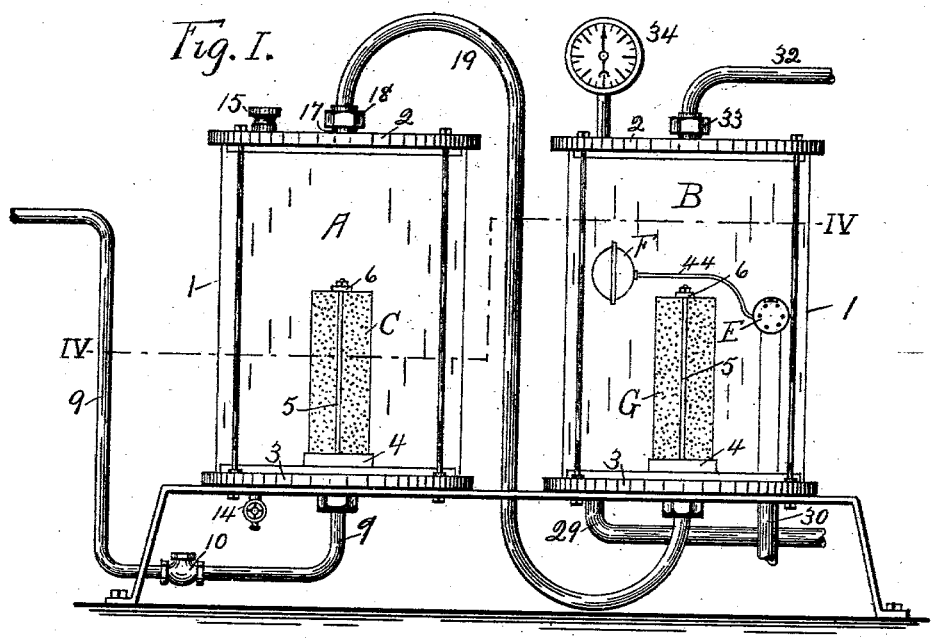
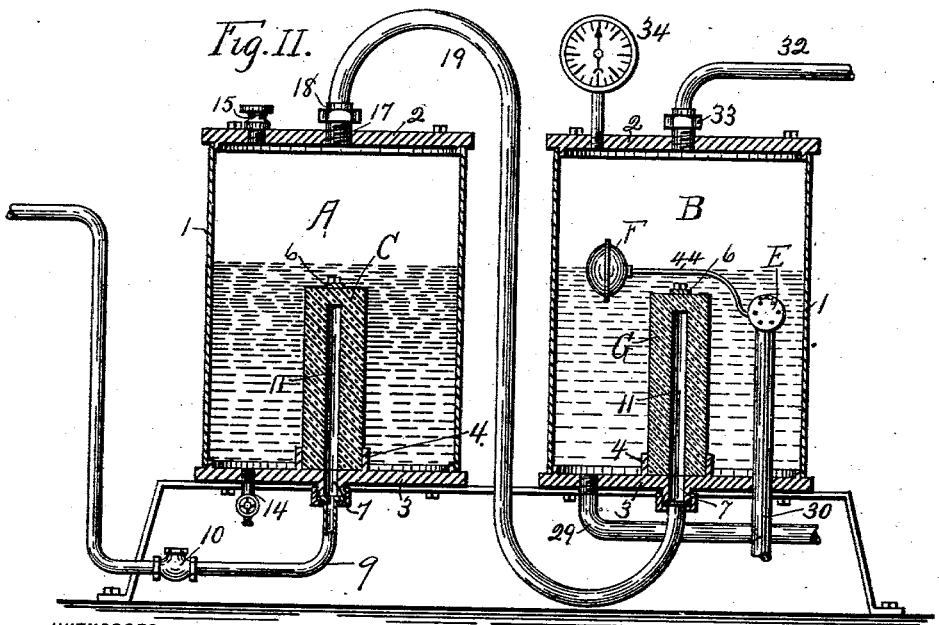
WITNESSES:
INVENTORS
Edward Zahm
John A. Just
BY
Alfred Wilkinson
ATTORNEY.

UNITED STATES PATENT OFFICE.

EDWARD ZAHM AND JOHN A. JUST, OF SYRACUSE, NEW YORK.

PROCESS OF PURIFYING GAS.

SPECIFICATION forming part of Letters Patent No. 716,803, dated December 23, 1902.

Application filed April 10, 1900. Renewed July 29, 1902. Serial No. 117,456. (No specimens.)

*To all whom it may concern:*

Be it known that we, EDWARD ZAHM and JOHN A. JUST, of Syracuse, in the county of Onondaga, in the State of New York, have invented a new and useful Process of Purifying Gases, of which the following, taken in connection with the accompanying drawings, is a full, clear, and exact description.

Our invention is a new process for purifying and washing gases; and it consists, essentially, in forcing the gas through a porous medium immersed in a purifying liquid, by which the gas is finely broken up and brought into intimate contact with the purifying liquid.

For the purpose of carrying out our new process we have illustrated and herein described a simple and convenient form of apparatus; but as it is our intention to make it the subject-matter of a separate application no claim will be made to it in the present application.

Other forms of apparatus may be devised for carrying out the process; but we prefer the one illustrated in the accompanying drawings, in which—

Figure I is an elevation of the mechanism, and Fig. II the same in vertical section.

In the figures, A indicates the vessel containing some suitable antiseptic or purifying solution. This vessel may be conveniently made of a glass cylinder 1, metallic cap 2, and base 3, the latter being provided with a socket 4, in which is retained the porous medium or core C by clamping-rods 5 and plate 6, 7 being the inlet for the gas from pipe 9, provided with valve 10.

The porous medium may be made of any suitable material and form, its essential feature being a greater or less degree of porosity, so that the gas is forced through fine interstices to be finely subdivided, thus presenting the greatest surface for action. It is preferably made of some earthenware material, which best resists the action of chemical reagents, heat, &c. As here shown, this medium may be molded in the form of a core of elongated cylindrical form with a hollow center 11 in continuation of the inlet, so that the thickness of material through which the gas passes is substantially equal at all points. This core may be formed of granular material contained in a suitable case, but such form is not so convenient.

14 is a draw-off in the base, and 15 supply-cock in cap 2, closing opening for introduction of the cleansing solution.

17 is the air-outlet, to which is fitted bushing 18 and outlet-pipe 19 for conducting the cleansed air to any suitable reservoir or place for use. As here shown, gas may be carried through pipe 19 to second reservoir B, of similar construction to the first, fitted with a similar core G, to the interior of which gas is conducted from first reservoir. This second reservoir is filled with water, which may be renewed from time to time, or a regulable flow of water through it is kept up, 29 being the water-inlet pipe and 30 the water-outlet pipe, through which the flow of water is automatically controlled by valve E and float F.

32 is the air-outlet pipe, 33 bushing therefor, and 34 an air-pressure gage which may be used, if desired.

Heretofore gases have been washed by delivering them under pressure into a liquid, but imperfectly. The gas passes through in comparatively large bubbles, it is not finally broken up to be brought in intimate contact with the purifying liquid, and the result is essentially different from that of our process, where the perfect purifying, washing, or sterilizing is effected.

In our invention the purifying liquid also tends to penetrate the core to some extent, so that the gas is mixed and churned up with it within the mass of the core itself, and there is an intimate mixture of the gas with the liquid both within and without the porous medium. After the gas has thus been purified it may be forced through a second core, arranged in a second vessel containing pure water, to remove all traces of the antiseptic solution itself.

We do not limit ourselves to the number of cores or other porous mediums through which it may be passed. Usually one or two will be sufficient, but the gas may be forced through several in different liquids to remove different impurities.

The mechanism here shown is simple and convenient, but we do not limit ourselves to this form or arrangement of parts. These may be much varied to suit varying conditions. The porous medium may be in different forms or divided into two or more bodies in each vessel, the gas may be introduced through the top, sides, &c., the essential feature being that all the gas must pass through a porous medium completely submerged in the purifying liquid.

Having thus fully described our invention, what we claim, and desire to protect by Letters Patent, is—

1. The process of purifying gases which consists in forcing the gas through a porous medium submerged in a purifying liquid.

2. The process of purifying gases which consists in forcing the gas under pressure through a series of porous cores each core being submerged in a purifying liquid in a suitable vessel.

3. The herein-described process of purifying gases, which consists in forcing the gas through a chambered porous medium, said medium being submerged in an antiseptic or purifying liquid, whereby an intimate mixture of the gas with the liquid, both within and without the porous medium, is obtained.

4. The herein-described process of purifying gases, consisting of forcing the gas through a hollow core of porous material submerged in an antiseptic or purifying liquid, whereby the gas is first finely broken up and brought into intimate contact with the liquid.

In testimony whereof we have hereunto signed our names.

EDWARD ZAHM. [L. S.]
JOHN A. JUST. [L. S.]

Witnesses:
C. C. SCHOENECK,
M. T. BROWNELL.